United States Patent
Abihana et al.

(10) Patent No.: US 9,020,670 B2
(45) Date of Patent: Apr. 28, 2015

(54) HYBRID ELECTRIC VEHICLE AND METHOD FOR SMOOTH ENGINE OPERATION WITH FIXED THROTTLE POSITION

(75) Inventors: Osama A. Abihana, Dearborn, MI (US); Douglas Raymond Martin, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 797 days.

(21) Appl. No.: 13/332,468

(22) Filed: Dec. 21, 2011

(65) Prior Publication Data

US 2013/0166115 A1 Jun. 27, 2013

(51) Int. Cl.
| | |
|---|---|
| *B60W 10/06* | (2006.01) |
| *B60W 20/00* | (2006.01) |
| *F02D 29/02* | (2006.01) |
| *F02D 9/02* | (2006.01) |
| *F02D 41/12* | (2006.01) |
| *F02D 11/10* | (2006.01) |
| *B60W 30/18* | (2012.01) |

(52) U.S. Cl.
CPC ............... *B60W 10/06* (2013.01); *F02D 29/02* (2013.01); *F02D 9/02* (2013.01); *F02D 41/123* (2013.01); *F02D 11/105* (2013.01); *F02D 2200/1002* (2013.01); *F02D 2250/24* (2013.01); *B60W 30/18054* (2013.01); *B60W 30/18072* (2013.01); *B60W 2710/0666* (2013.01); *B60Y 2300/435* (2013.01); *B60Y 2300/46* (2013.01); *Y10S 903/905* (2013.01)

(58) Field of Classification Search
USPC .......................................................... 701/22
See application file for complete search history.

(56) References Cited

U.S. PATENT DOCUMENTS

| | | | | |
|---|---|---|---|---|
| 3,791,473 | A | * | 2/1974 | Rosen ........................ 180/65.26 |
| 4,021,677 | A | * | 5/1977 | Rosen et al. ................ 290/40 R |
| 5,786,640 | A | * | 7/1998 | Sakai et al. ..................... 290/17 |
| 5,846,155 | A | * | 12/1998 | Taniguchi et al. ................ 477/2 |
| 6,009,371 | A | * | 12/1999 | Kobayashi .................... 701/112 |
| 6,809,429 | B1 | * | 10/2004 | Frank .......................... 290/40 C |
| 6,962,224 | B2 | | 11/2005 | Nakanowatari | |
| 7,085,631 | B2 | | 8/2006 | McGee et al. | |

(Continued)

FOREIGN PATENT DOCUMENTS

| | | |
|---|---|---|
| EP | 2084054 A1 | 4/2009 |
| JP | 2007315207 A | 12/2007 |
| JP | 2007331689 A | 12/2007 |

OTHER PUBLICATIONS

Romney, P D et al., Throttleless premixed-charge engines: concept and experiment, Technical Paper, vol. 208, Jun. 21, 1993, Komatsu Limited, Tochigi, Japan.

*Primary Examiner* — Shelley Chen
(74) *Attorney, Agent, or Firm* — David B. Kelley; Brooks Kushman P.C.

(57) ABSTRACT

A torque management strategy for an HEV having an engine operating with a fixed throttle position to better manage NVH while the vehicle is stationary or decelerating and the engine is generating more torque than a requested torque uses excess engine torque to charge the battery until the requested torque is below a torque loss threshold. Partial fuel injector cut off is avoided to reduce or eliminate associated NVH by adjusting a misfire torque limit to the expected or estimated engine torque produced during operation at the fixed throttle position until the requested torque results in complete fuel cut off to all cylinders.

13 Claims, 2 Drawing Sheets

(56) References Cited

U.S. PATENT DOCUMENTS

| | | |
|---|---|---|
| 7,229,381 B2 | 6/2007 | Niessen et al. |
| 7,707,874 B2 | 5/2010 | Suzuki |
| 7,813,865 B2 | 10/2010 | Martin |
| 7,918,762 B2* | 4/2011 | Muta et al. .................. 477/97 |
| 2002/0056584 A1* | 5/2002 | Nakasako et al. ............ 180/248 |
| 2002/0142884 A1* | 10/2002 | Kitajima et al. .................. 477/2 |
| 2004/0099459 A1* | 5/2004 | Nakasako et al. ............ 180/248 |
| 2005/0266957 A1* | 12/2005 | Kamijo et al. .................... 477/3 |
| 2005/0272556 A1* | 12/2005 | Hiroe et al. ....................... 477/3 |
| 2007/0080005 A1* | 4/2007 | Joe .............................. 180/65.2 |
| 2007/0243970 A1* | 10/2007 | Amano et al. ..................... 477/3 |
| 2007/0298928 A1* | 12/2007 | Yamanaka et al. .............. 477/15 |
| 2008/0045377 A1* | 2/2008 | Kaya ................................ 477/43 |
| 2008/0200305 A1* | 8/2008 | Anderson ....................... 477/187 |
| 2008/0227589 A1* | 9/2008 | Zillmer et al. ..................... 477/3 |
| 2009/0044996 A1* | 2/2009 | Frank .......................... 180/65.29 |
| 2009/0105043 A1* | 4/2009 | Muta et al. ...................... 477/97 |
| 2010/0063658 A1 | 3/2010 | Martin et al. |
| 2010/0280737 A1* | 11/2010 | Ewert et al. ................... 701/102 |
| 2011/0021310 A1* | 1/2011 | Kresse et al. ..................... 477/3 |
| 2012/0316754 A1* | 12/2012 | Narayanaswamy et al. .. 701/103 |
| 2013/0045835 A1* | 2/2013 | Schang et al. ................... 477/78 |

* cited by examiner

HYBRID ELECTRIC VEHICLE AND METHOD FOR SMOOTH ENGINE OPERATION WITH FIXED THROTTLE POSITION

TECHNICAL FIELD

The present invention relates to a method of operating an engine of a hybrid electric vehicle (HEV) such that no partial fuel cutout of the engine occurs while in a fixed throttle position.

BACKGROUND

An internal combustion engine must receive at least a minimum amount of air flow to operate with stable combustion. This engine operating point may be referred to as a combustion stability limit. The combustion stability limit may be defined in terms of air flow translated into an engine brake torque value. Thus, a minimum engine torque may be specified to ensure stable combustion. This torque value, sometimes referred to as the misfire limit, is the lower bound of the engine torque production.

The engine air intake system may include a throttle valve to regulate the intake airflow and indirectly control the charge (fuel and air) burned in each combustion cycle. The throttle valve position may be electronically controlled by the engine controller in response to various engine and ambient operating conditions. On or more operating parameters, such as fuel injection quantity and timing, may be scheduled and/or adjusted based on the throttle position and corresponding amount of airflow entering the engine. As such, the engine power can be changed depending on the throttle position.

When the engine is operating with a particular throttle position and operating conditions change such that reduced engine torque is requested (e.g. an accelerator pedal tip-out), under some conditions the throttle may remain fixed in position such that the engine generates more torque than requested by the vehicle system controller. In this event, a partial fuel injector cutout may occur to reduce the engine torque to the desired torque target. However, a partial fuel injector cutout may produce undesirable noise, vibration, and harshness (NVH).

SUMMARY

In one embodiment, a method for operating a hybrid vehicle having an engine, a battery, and a generator includes setting or adjusting a misfire torque limit to the estimated or expected torque resulting from engine operation at a fixed throttle position to inhibit fuel injector cutout. An engine torque request that is greater than the misfire limit results in no fuel cut to the engine. An engine torque request that is less than both the misfire limit and a minimum torque loss value results in a full fuel cut to all engine cylinders. The method may also include adjusting an engine torque request that is less than the misfire limit and is greater than the magnitude of the minimum torque loss level to be greater than the misfire limit and controlling the engine using the adjusted engine torque request. Any resulting excess engine torque may be used to charge the battery.

A method for operating a hybrid vehicle having an engine and a battery according to one embodiment includes setting a misfire limit corresponding to an expected torque of the engine resulting from fixed throttle operation in response to detecting operation with a fixed throttle position. The method may include receiving an engine torque request while the engine is operating with a fixed throttle position and operating the engine using the torque request if the engine torque request is greater than the misfire limit such that no fuel cut is indicated, and cutting all fuel if the engine torque request is less than the a minimum torque loss level. This method further includes adjusting the engine torque request to be greater than the misfire limit if the engine torque request is less than the misfire limit and is greater than the magnitude of the minimum torque loss level and issuing the adjusted engine torque request to the engine such that no fuel is cut to the engine.

In one embodiment, a system having an engine and a controller operates to set a misfire limit to an expected torque of the engine resulting from fixed throttle operation to provide smooth engine operation when operating with a fixed throttle position. The controller is configured such that an engine torque request greater than the misfire limit results in no fuel cut to the engine. An engine torque request that is less than both the misfire limit and the magnitude of a minimum torque loss level results in a full fuel cut to the engine. The controller is further configured to adjust an engine torque request that is less than the misfire limit and is greater than the magnitude of the minimum torque loss level to be greater than the misfire limit and issue the adjusted engine torque request to the engine.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

As indicated above, under certain operating conditions with a fixed throttle position, the engine of a vehicle generates more torque than needed by the vehicle system controller if the vehicle is stationary or decelerating. Rather than allowing a partial fuel injector cutout to reduce the engine torque to the desired torque target, various embodiments of the present disclosure continue to operate the engine at the fixed throttle position and use excess torque to charge the battery, or provide a complete fuel injector cutout to reduce or eliminate undesirable NVH.

Embodiments of the present invention solve the problem associated with partial fuel cuts during fixed throttle operation by taking advantage of the fact that in a HEV the excess engine power that is not absorbed by the traction wheels can be diverted to charge the traction battery of the HEV, such as when the HEV is stopped or decelerating. Accordingly, the engine may be fully fueled and continue to operate with a fixed throttle position rather than initiating a partial fuel cut to reduce the engine power to a level that the traction wheels can absorb, with the traction battery absorbing any excess engine power for subsequent use. The resulting charging of the battery can be used to extend the range and performance of the HEV.

Figure 1:
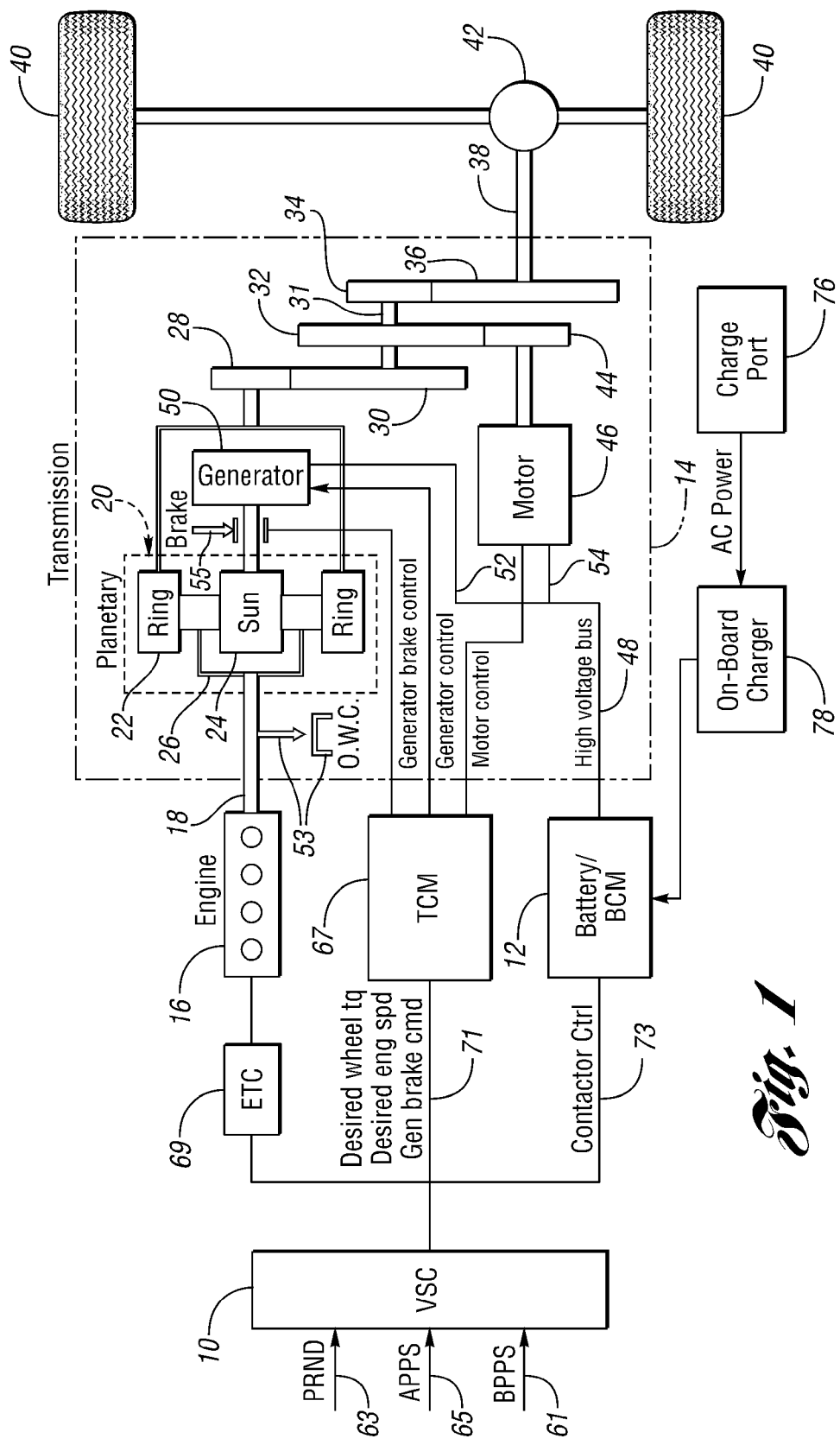
FIG. 1 is a schematic representation of a hybrid electric vehicle (HEV) powertrain illustrating operation of a system or method according to various embodiments of the present invention.

Referring now to FIG. 1, a schematic representation of a HEV powertrain capable of embodying the present invention is shown. The powertrain includes two power sources that are connected to the driveline: 1) an internal combustion engine 16 and a generator 50 connected together via a planetary gear arrangement 20; and 2) an electric drive system including a battery 12, an electric motor 46, and a generator 50. Battery 12 is an energy storage system for motor 46 and generator 50.

A vehicle system controller (VSC) 10 is configured to send control signals to, and receive sensor feedback information from, one or more of battery 12, engine 16, motor 46, and generator 50 to control power provided to vehicle traction wheels 40 and propel the vehicle to meet driver demand. Controller 10 controls the power source proportioning between battery 12 and engine 16 for providing power to propel the vehicle and thereby controls the state of charge (SOC) of battery 12. Controller 10 may communicate with one or more other controllers over a controller area network (CAN) and provide status and control messages and commands. Other controllers or control modules may include an engine control module (ECM), powertrain control module (PCM), battery control module (BCM), and the like. Various controllers may include a microprocessor in communication with a memory management unit (MMU), which controls the movement of data and instructions between the microprocessor and various computer readable storage media. The computer readable storage media may in include volatile and nonvolatile or persistent storage in read-only memory (ROM), random-access memory (RAM), and keep-alive memory (KAM), for example. KAM may be used to store various operating variables while the controller is powered down. The computer-readable storage media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the microprocessor to control the vehicle.

In one embodiment, the computer readable storage media include stored data or code representing instructions executable by a microprocessor within VSC 10 to control a HEV as illustrated and described with reference to FIGS. 1 and 2. The code includes instructions that control operation of engine 16 with a fixed throttle position to manage NVH while controlling torque delivered to vehicle wheels 40 as described in greater detail herein. The code may also include instructions that continue to operate engine 16 with a fixed throttle position while the vehicle is stationary or decelerating by controlling generator 50 and motor 46 to charge battery 12.

Transmission 14 includes planetary arrangement 20, which includes a ring gear 22, a sun gear 24, and a carrier assembly 26. Ring gear 22 distributes torque to step ratio gears comprising meshing gear elements 28, 30, 32, 34, and 36. A torque output shaft 38 of transmission 14 is driveably connected to wheels 40 through a differential-and-axle mechanism 42.

Gears 30, 32, and 34 are mounted on a counter shaft 31 with gear 32 engaging a motor-driven gear 44. Motor 46 drives gear 44. Gear 44 acts as a torque input for counter shaft 31.

Engine 16 distributes torque through input shaft 18 to transmission 14. Battery 12 delivers electric power to motor 46 through power flow path 48. Generator 50 is connected electrically to battery 12 and to motor 46, as shown at 52.

While battery 12 is acting as a sole power source with engine 16 off, input shaft 18 and carrier assembly 26 are braked by an overrunning coupling (i.e., one-way clutch (OWC)) 53. A mechanical brake 55 anchors the rotor of generator 50 and sun gear 24 when engine 16 is on and the powertrain is in a parallel drive mode with sun gear 24 acting as a reaction element.

Controller 10 receives a signal PRND (park, reverse, neutral, drive) from a transmission range selector 63 that is distributed to transmission control module (TCM) 67, together with a desired wheel torque, a desired engine speed, and a generator brake command, as shown at 71. A battery switch 73 is closed after vehicle "key-on" startup. Engine 16 may be a throttle-controlled internal combustion engine. As generally understood by those of ordinary skill in the art, a throttle-controlled engine includes an intake having a throttle valve that controls aiflow into engine 16. The throttle valve position is feedback controlled by controller 10 using a small motor to move the throttle valve and a throttle valve position sensor to provide a feedback signal indicative of actual throttle valve position. Controller 10 generates an engine torque request for engine 16 at least in part based on a signal from an accelerator pedal position sensor (APPS) 65 and current engine, vehicle, and/or ambient operating conditions. The engine torque request is used to generate a corresponding signal for an electronic engine throttle control (ETC) module 69, which effects feedback position control of the throttle plate to control airflow and resulting engine torque.

A brake pedal position sensor (BPPS) provides a wheel brake signal to controller 10, as shown at 61. A brake system control module (not shown) may issue a regenerative braking command based on information from the BPPS. TCM 67 issues a generator brake control signal to generator brake 55. TCM 67 also distributes a generator control signal to generator 50.

In the representative embodiment of an HEV illustrated in FIG. 1, the HEF is a plug-in hybrid electric vehicle (PHEV) such that battery 12 is rechargeable from an external electric power source (e.g., an external electric utility grid or generator). Battery 12 periodically receives AC electrical energy from the grid via a charge port 76 connected to the grid. An on-board charger 78 receives the AC electrical energy from charge port 76. Charger 78 is an AC/DC converter that converts the received AC electrical energy into DC electrical energy suitable for charging battery 12. In turn, charger 78 supplies the DC electrical energy to battery 12 to charge battery 12 during the recharging operation (i.e., a charging event).

As previously described, the HEV includes an engine 16 and a motor 46 that function as complementary power sources for developing vehicle traction power. The first power source includes a combination of engine 16 with planetary arrangement 20 for distributing power through separate flow paths. The second power source is an electric drive system that includes battery 12, motor 46, and generator 50. Battery 12 acts as an energy storage medium for motor 46 and generator 50. Generator 50 provides electrical power to motor 46, which delivers motive power to traction wheels 40 through planetary arrangement 20. When the powertrain is operating using the first power source, the engine power is divided between the two paths by controlling the speed of generator 50.

As engine 16 and generator 50 are connected through planetary arrangement 20, generator 50 can act as a generator to provide current to charge battery 12 which powers motor 46, or generator 50 may operate as a motor to provide torque input to planetary arrangement 20. Generator 50 can be used to control the rotational speed of engine 16 as generator 50 is connected to a torque reaction element of planetary arrangement 20. Both motor 46 and generator 50 may act as motors using current from battery 12 to provide the desired traction wheel torque. Alternatively, both motor 46 and generator 50 may act as generators to supply electrical power to battery 12 through high voltage bus 48 that electrically couples battery 12, motor 46, and generator 50.

Engine 16 may operate in a torque control mode or an engine speed control mode. In either operating mode, excess torque produced by engine 16 may drive motor 46 and/or generator 50 to develop charging current for battery 12. Accordingly, excess engine power that is not delivered to wheels 40 can be used to charge battery 12, such as when the vehicle is stopped or decelerating and engine 16 is operating with a fixed throttle position.

Figure 2:
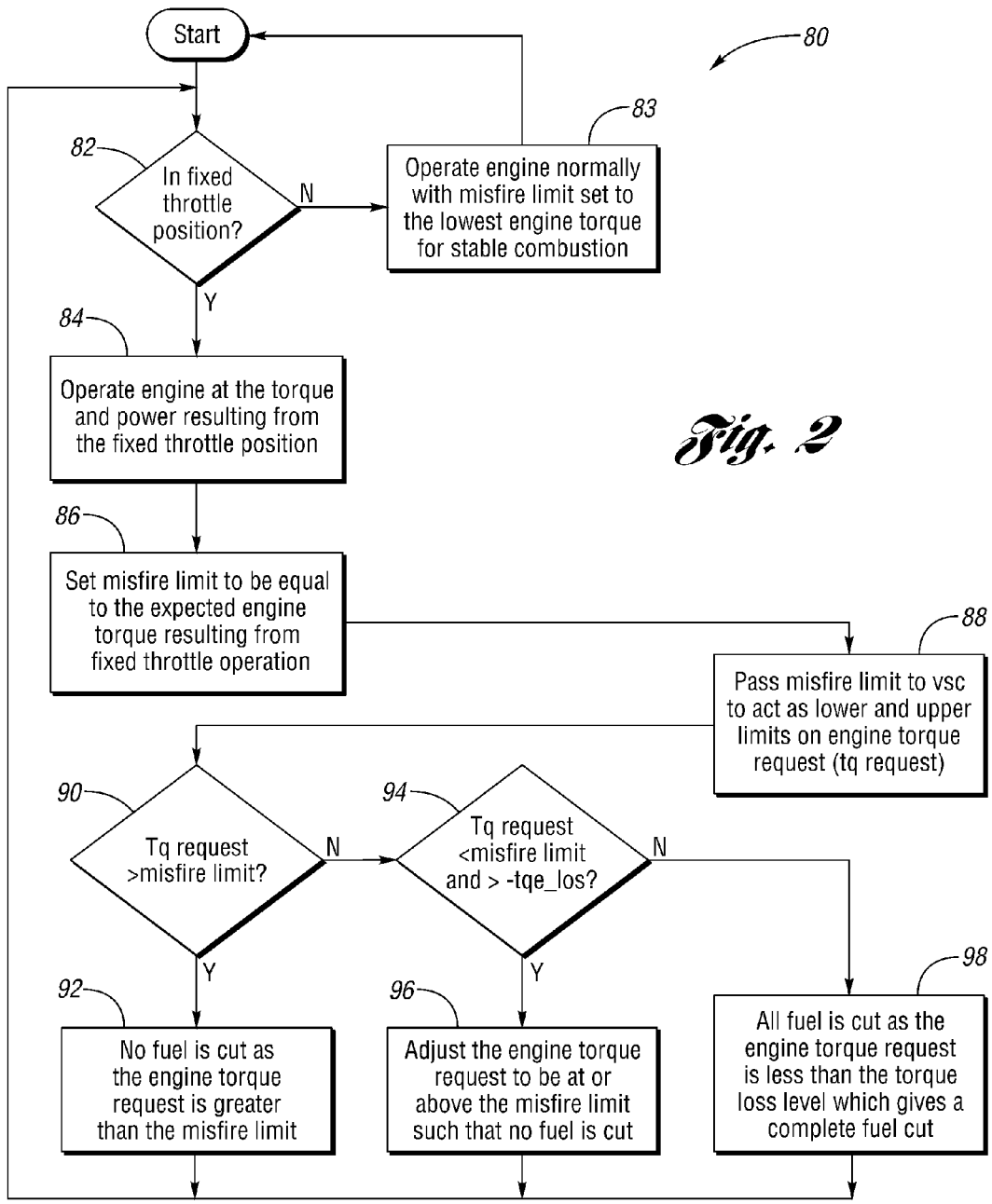
FIG. 2 is a flow chart illustrating operation of a system or method of operating an HEV to provide smooth engine operation in response to a fixed throttle position in accordance with various embodiments of the present invention.

Referring now to FIG. 2, a flow chart 80 illustrates operation of a system or method for managing NVH in a HEV powertrain when operating the engine with a fixed throttle position according to embodiments of the present disclosure. More particularly, as indicated above, the engine is operated pursuant to the method such that the fueling of the engine either is completely maintained (i.e., no fuel cut) or is completely cut off (i.e., a full fuel cut) in response to the fixed throttle position depending on certain engine, vehicle, and/or ambient operating conditions. The operation of the method as set forth in flow chart 80 will be described with reference to the HEV shown in FIG. 1. As those of ordinary skill in the art will understand, the functions represented by the flow chart blocks may be performed by software and/or hardware associated with one or more controllers or control modules, such as VSC 10, TCM 67, and BCM/battery 12. Depending upon the particular processing strategy, such as event-driven, interrupt-driven, etc., the various functions may be performed in an order or sequence other than illustrated in FIG. 2. Similarly, one or more steps or functions may be repeatedly performed, although not explicitly illustrated. In one embodiment, the functions illustrated are primarily implemented by software, instructions, or code stored in a persistent or non-volatile computer readable storage medium and executed by a microprocessor-based computer or controller to control operation of the vehicle.

Operation of the system or method begins with determining whether the engine 16 is operating with a fixed throttle position as indicated in decision block 82. The throttle may be determined to be at a fixed throttle position after the throttle position does not change in a given predetermined period of time. The predetermined period of time may vary based on engine, vehicle, or ambient operating conditions. Block 82 may also determine whether the HEV is stationary or decelerating based on wheel speed sensors or transmission output shaft speed, for example. As previously described, if engine 16 continues to operate a particular fixed throttle position while the vehicle is stationary or decelerating, engine 16 may generate more torque than needed to propel traction wheels 40 for an associated driver requested torque or power based on APPS 65.

If block 82 determines that the throttle is not at a fixed throttle position, or if a fixed throttle position is indicated but the vehicle is not stationary or decelerating, then engine 16 is operated normally with respect to the misfire limit, which is set to the lowest engine torque for stable combustion under current engine and ambient operating conditions as represented by block 83. As previously described, the misfire limit corresponds to the minimum engine torque needed to operate the engine with stable combustion. As described in greater detail below, the misfire limit may be temporarily adjusted to a higher engine torque when operating with a fixed throttle to prevent partial fuel cut and associated NVH.

If the throttle is at a fixed throttle position, then engine 16 is operated at the torque and power resulting from the fixed throttle position as indicated in block 84. Again, block 84 may be implemented when in fixed throttle position and either the HEV is not moving or is decelerating.

The operation of the method proceeds from block 84 to block 86. In block 86, controller 10 sets the misfire limit to the expected engine torque resulting from fixed throttle operation. That is, controller 10 changes the misfire limit from being the ordinary misfire limit to a modified misfire limit. The modified misfire limit or "fixed throttle misfire limit" is equal to the expected engine torque produced by the engine as a result of operating in the fixed throttle position according to block 84. The expected engine torque at the fixed throttle position is generally greater than the minimum engine torque required for stable combustion. As such, in block 86, the misfire limit is effectively raised from the ordinary misfire limit which corresponds to the minimum engine torque required for stable combustion to the fixed throttle misfire limit which corresponds to the expected engine torque resulting from fixed throttle operation. Controller 10 calculates the engine torque and power resulting from the fixed throttle position operation and uses that engine torque as the engine torque request which now becomes the fixed throttle misfire limit.

Controller 10 stores the fixed throttle misfire limit for use as lower and upper limits on the requested engine torque as represented by block 88 and described in greater detail below. Prior control strategies associated with conventional engine-powered (i.e. non-hybrid) vehicles accommodated fixed throttle operation using a partial fuel cut to reduce engine torque produced by engine 16. However, this resulted in undesirable NVH. The present disclosure recognizes that HEV implementations provide the ability to accommodate fixed throttle engine operation in an alternative fashion. As such, the system and method illustrated in the embodiments of FIGS. 1 and 2 implement an alternative torque management strategy to avoid a partial fuel cut and associated NVH. While partial fuel cut may be used under various other operating conditions, fixed throttle operation according to embodiments of the present disclosure avoids partial fuel cut if any of the following three conditions are satisfied: (i) the engine torque request is greater than the fixed throttle misfire limit; (ii) the engine torque request is less than the fixed throttle misfire limit and is greater than the torque level associated with a full fuel cut, but the engine torque request is adjusted to be at or above the fixed throttle misfire limit; or (iii) the engine torque request is less than the torque level that gives a full fuel cut. In cases (i) and (ii), there is no fuel cut and the engine is fully fueled. In case (iii), there is a complete fuel cut and the engine receives no fuel. As such, in all of cases (i), (ii), and (iii), there is no partial fuel cut.

Blocks 90-98 of FIG. 2 implement a control strategy to assure that at least one of the cases (i), (ii), and (iii) exists at any given time. In particular, blocks 90-98 result in case (ii) when appropriate such that an engine torque request less than the fixed throttle misfire limit and greater than the torque level that gives a full fuel cut is adjusted to be at or above the misfire limit. As a result, there is no partial fuel cut that would otherwise occur if the engine torque request were not adjusted to be at or above the fixed throttle misfire limit. Any engine torque that is not needed to drive traction wheels 40 is then used to charge battery 12. As such, the strategy represented by blocks 90-98 of FIG. 2 results in fueling the engine in response to a fixed throttle position rather than a requested torque associated with an accelerator pedal position while charging the battery to use any engine torque generated in excess of the requested torque while requested torque exceeds a threshold (tqe-los) as represented by blocks 90, 92, 94, and 96, and cutting off fuel to all cylinders otherwise as represented by block 98.

In decision block 90, the engine torque request is compared to the fixed throttle misfire limit. If the engine torque request is greater than the fixed throttle misfire limit, then no fuel is cut as indicated in block 92. In this event, engine 16 is operated with no fuel cuts and all cylinders of engine 16 are fueled. As such, there is no adjustment to the engine torque request and there is no partial fuel cut.

If the engine torque request is less than the fixed throttle misfire limit, then the operation of the method proceeds from decision block 90 to decision block 94. In decision block 94, the engine torque request is again compared to the fixed throttle misfire limit and the torque loss level. System losses, such as friction losses and pumping losses, for example, are generally represented by a negative torque loss term ("tqe_los"). If the engine torque request is less than the torque needed to overcome the system losses, as determined by block 94, then all fuel is cut as represented by block 98. If the engine torque request is less than the fixed throttle misfire limit and is greater than the magnitude of the torque loss level, then the engine torque request is adjusted to be equal to or greater than the fixed throttle misfire limit as indicated at block 96. In this event, like block 92, engine 16 is operated with no fuel cuts and all cylinders of engine 16 are fueled. The adjustment of the engine torque request may include clipping the engine torque request to be at or above the fixed throttle misfire limit. As noted above, without this adjustment of the engine torque request, a partial fuel cut would occur. Accordingly, the partial fuel cut is avoided by adjusting the engine torque request to be at or above the fixed throttle misfire limit such that full fueling is maintained.

Operation controlled according to blocks 92 and 96 will continue operating the engine with the fixed throttle position and corresponding fueling such that the engine generates more torque than required to drive the traction wheels. As such, VSC 10, battery/BCM12, and TCM 67 operate to control generator 50 and motor 46 to charge the battery using any excess engine torque until the requested torque is less than the torque loss term, where all fuel is cut to the engine cylinders. Stated differently, various embodiments according to the present disclosure fuel the engine in response to the fixed throttle position rather than the requested torque until the requested torque is less than a corresponding threshold representing system loss torque. When the requested torque is less than the threshold (tqu_los), all fuel is cutoff so that the engine is no longer generating torque. This allows smooth engine operation between full fueling and complete cutoff by maintaining or continuing engine operation at the fixed throttle position with excess engine torque used to charge the vehicle battery until no engine torque is needed, which avoids partial fuel cutoff and associated NVH as a torque management strategy.

As demonstrated by the representative embodiments described above, various embodiments according to the present disclosure provide an alternative torque management strategy for an HEV having an engine operating with a fixed throttle position to better manage NVH. While the engine operates with a fixed throttle position and the vehicle is stationary or decelerating, the engine generates more torque than needed by the vehicle system controller. Rather than allowing a partial fuel injector cutout to reduce the engine torque to the desired torque target such as performed in conventional internal combustion engine control, various embodiments of the present disclosure continue to operate the engine at the fixed throttle position and use excess engine torque to charge the battery until the requested torque is below a corresponding level to provide a complete fuel injector cutout to reduce or eliminate undesirable NVH associated with partial fuel cutout.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for controlling a hybrid electric vehicle having an engine with a throttle and a battery powered traction motor, comprising:
    operating the engine with a fixed throttle position while the vehicle is stationary or decelerating to generate excess engine torque relative to a requested engine torque;
    charging the battery using the excess engine torque; and
    cutting off fuel to the engine when the requested engine torque is less than a threshold torque;
    wherein operating the engine with a fixed throttle position includes adjusting a misfire torque limit associated with a minimum torque for stable combustion to provide an adjusted misfire torque limit corresponding to an engine torque calculated based on fueling all engine cylinders and airflow associated with the fixed throttle position.

2. The method of claim 1 further comprising setting the requested engine torque to the adjusted misfire torque limit.

3. The method of claim 2 wherein the requested engine torque is set to the adjusted misfire torque limit only if the requested engine torque is less than the adjusted misfire torque limit.

4. The method of claim 2 wherein the requested engine torque is adjusted to the adjusted misfire torque limit if the requested engine torque is less than the adjusted misfire torque limit and greater than the threshold torque.

5. The method of claim 4 wherein the threshold torque corresponds to torque required to overcome system losses.

6. The method of claim 1 wherein the threshold torque corresponds to estimated engine torque losses.

7. A method comprising:
    fueling an engine based on a fixed throttle position rather than a requested torque while charging a battery with engine torque generated in excess of the requested torque while requested torque exceeds a threshold;
    cutting off fuel to all engine cylinders otherwise;
    adjusting a misfire torque limit corresponding to a minimum torque for stable combustion to an expected engine torque corresponding to operation at the fixed throttle position with all cylinders fueled.

8. The method of claim 7 further comprising:
    fueling the engine based on the requested torque if the requested torque exceeds the misfire torque limit such that no fuel is cut to the engine;
    cutting off fuel to all engine cylinders if the requested torque is less than the threshold wherein the threshold corresponds to engine losses; and
    adjusting the requested torque to be greater than the misfire torque limit if the requested torque is less than the misfire torque limit and greater than the threshold.

9. The method of claim 7 wherein charging the battery comprises controlling a generator coupled to the battery.

10. The method of claim 7 wherein the vehicle is a plug-in hybrid electric vehicle.

11. A hybrid electric vehicle comprising:
- a traction motor coupled to a battery;
- an engine having a throttle; and
- a controller coupled to the battery, traction motor, and throttle and configured to fuel the engine based on a fixed throttle position to generate excess torque relative to a requested torque, charge the battery using the excess torque, and cut off fuel to all engine cylinders when the requested torque is below a torque loss threshold;
- wherein the controller is further configured to adjust a misfire torque limit corresponding to a minimum torque for stable combustion to generate an adjusted misfire torque limit corresponding to an estimated engine torque when generated by fueling all cylinders with the throttle at the fixed throttle position.

12. The hybrid electric vehicle of claim 11 wherein the controller is further configured to adjust the requested torque to the adjusted misfire torque limit when the requested torque is less than the misfire torque limit.

13. The hybrid electric vehicle of claim 11 wherein the controller is further configured to adjust the requested torque to the adjusted misfire torque limit when the requested torque is less than the misfire limit and greater than the torque loss threshold.

* * * * *